United States Patent
Hare

[15] 3,701,364
[45] Oct. 31, 1972

[54] FAUCET BODY AND METHOD OF MANUFACTURE

[72] Inventor: Terence G. Hare, Union Lake, Mich.

[73] Assignee: Miller Manufacturing Company, Southfield, Mich.

[22] Filed: Jan. 4, 1971

[21] Appl. No.: 103,885

Related U.S. Application Data

[63] Continuation of Ser. No. 842,229, July 16, 1969, abandoned.

[52] U.S. Cl. ..................137/625.41, 251/367, 4/192
[51] Int. Cl. .............................................F16k 11/10
[58] Field of Search.........137/625.4, 625.41, 625.17, 137/359, 603, 606, 801; 29/527.6; 4/191, 192

[56] References Cited

UNITED STATES PATENTS

| | | |
|---|---|---|
| 2,680,455 | 6/1954 | Raiteri..............137/625.41 X |
| 2,911,009 | 11/1959 | Parker..................137/625.41 |
| 2,987,079 | 6/1961 | Page.................137/625.41 X |
| 3,056,418 | 10/1962 | Adams et al......137/625.41 X |
| 3,137,314 | 6/1964 | Woodhall.........137/625.41 X |
| 3,168,112 | 2/1965 | Klingler................137/625.17 |

Primary Examiner—M. Cary Nelson
Assistant Examiner—David R. Matthews
Attorney—Barnes, Kisselle, Raisch & Choate

[57] ABSTRACT

A faucet body comprising a brass casting having a valve seat and spaced annular walls. The valve seat has a pair of openings therein and the annular walls each have an opening therethrough. A conduit is positioned with one end adjacent one of the pair of openings and the other end adjacent an opening in the annular wall and a force is applied to the conduit to deform it into position after which the conduit is fixed to the faucet body.

12 Claims, 5 Drawing Figures

INVENTOR
TERENCE G. HARE
BY
Barnes, Kisselle, Raisch & Choate
ATTORNEYS

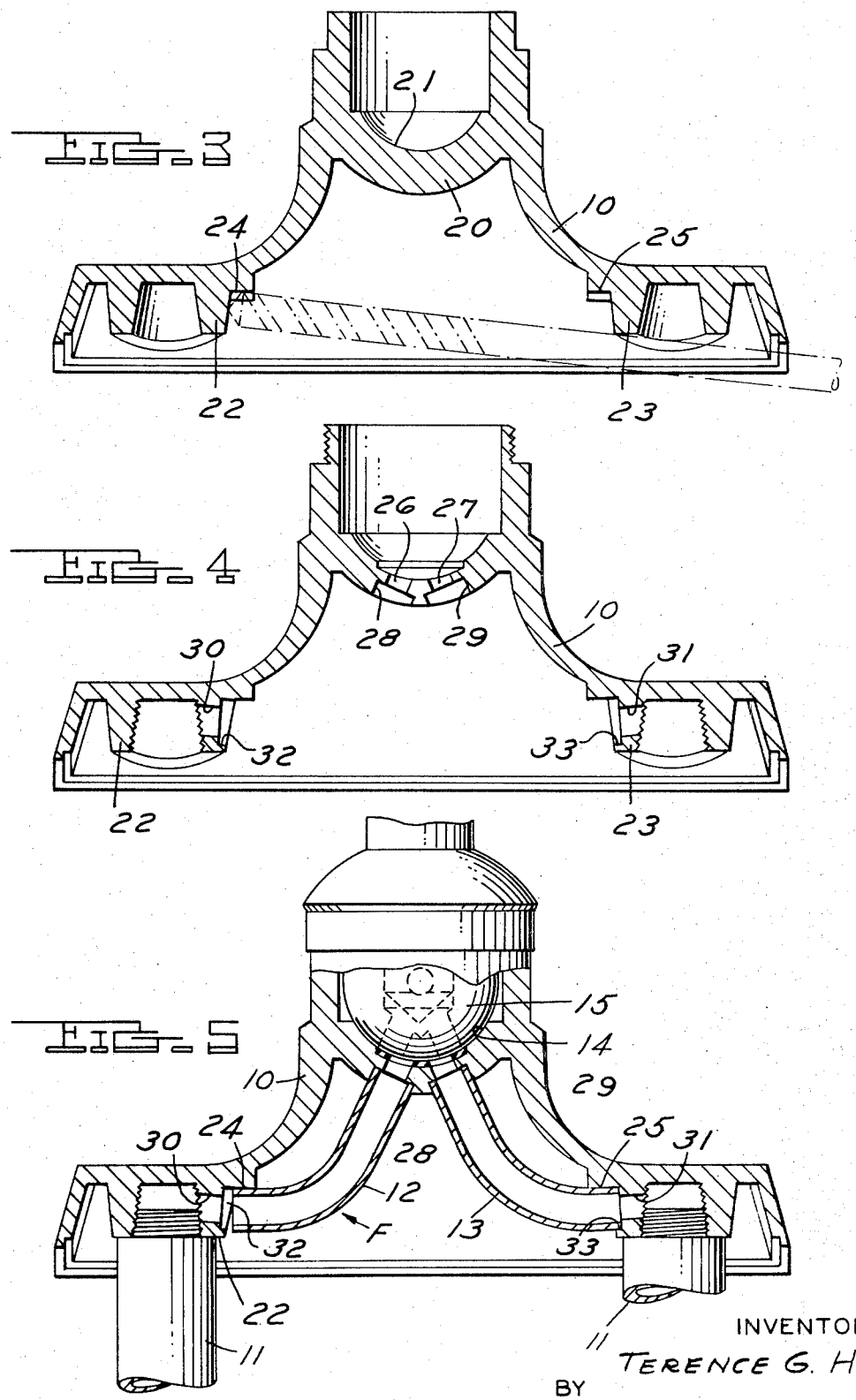

FAUCET BODY AND METHOD OF MANUFACTURE

This application is a continuation of Ser. No. 842,229 filed July 16, 1969, now abandoned.

This invention relates to faucet bodies and to a method of making faucet bodies.

BACKGROUND OF THE INVENTION

In the making of faucets for lavatories and the like, it has been heretofore difficult to utilize a brass casting because of the intricate coring problems inherent in trying to make long curved passages in the brass casting. Accordingly, die castings have been used and brass fittings have been fitted to the die castings. This results in substantial cost.

Accordingly, among the objects of the invention are to provide a faucet body which is made of brass and a method of forming the faucet body which permits the utilization of low-cost casting while, at the same time, obtains advantages of full utilization of the material.

DESCRIPTION OF THE DRAWINGS

FIG. 3 is a sectional view of the faucet body during a portion of the manufacture thereof.

FIG. 4 is a view similar to FIG. 3 showing a further step in the manufacture.

FIG. 5 is a section of the valve body similar to FIGS. 3 and 4 showing a further step in the manufacture and further showing parts of the faucet in position.

DESCRIPTION

Figures 1, 2:
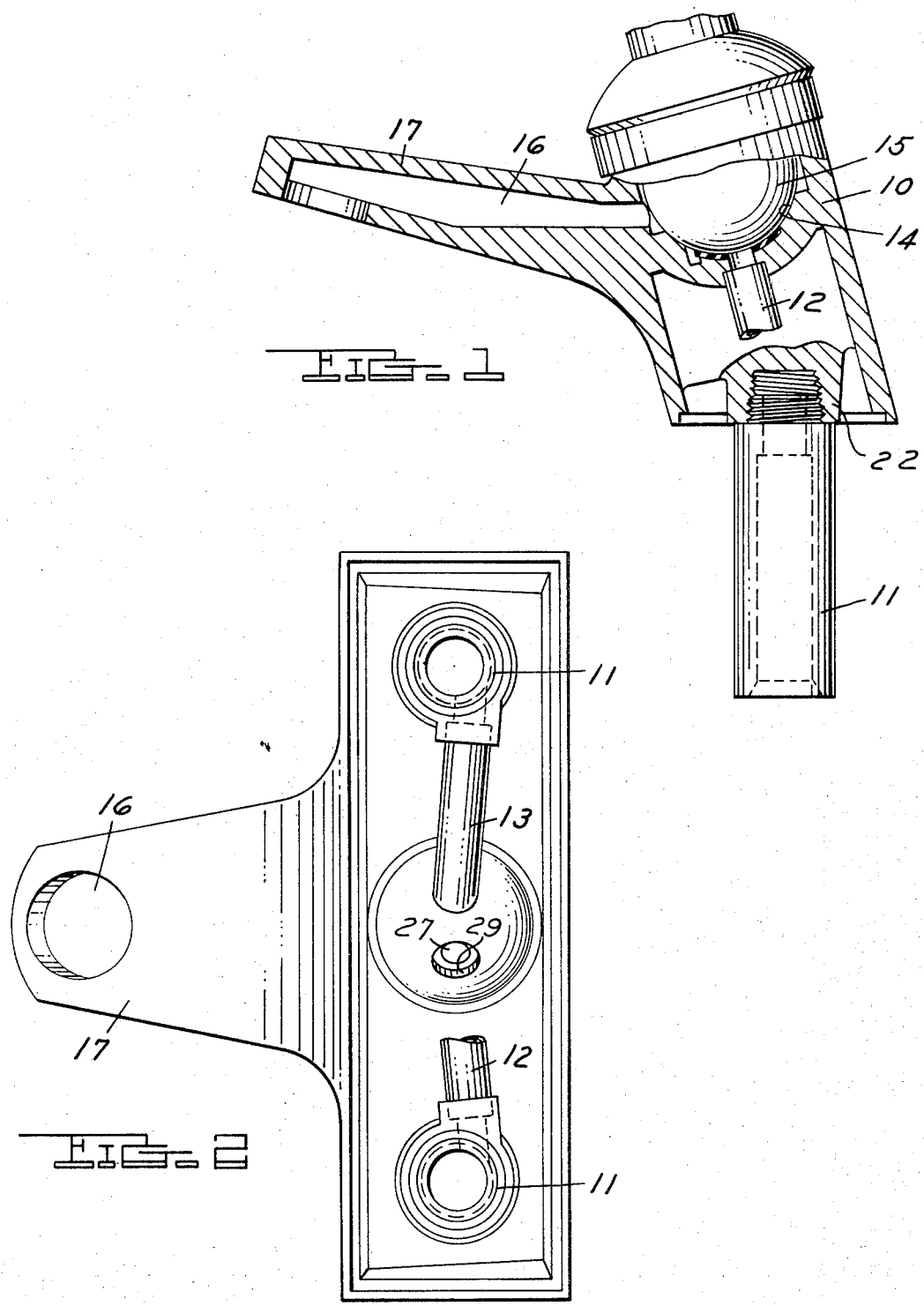
FIG. 1 is a part sectional side elevational view of a faucet body embodying the invention.
FIG. 2 is a bottom plan view of the same.

Referring to FIG. 1, the faucet embodying the invention comprises a body 10 which is a brass casting having spaced inlet pipes 11 threaded thereto, as presently described, to supply hot and cold water to conduits 12, 13 which extend to a valve seat 14. A ball valve 15 controls the flow from the pipes 12, 13 to the passage 16 of an integral spigot 17. The valve 15 and its associated structure may be of the type shown in the copending application of Terence G. Hare, Ser. No. 652,051 filed July 10, 1967, now U.S. Pat No. 3,506,036.

Referring to FIG. 3, the body 10 is formed as shown in a casting with a wall 20 defining a spherical valve seat 21. The body further includes spaced annular walls 22, 23 and integral saddle or guide surfaces 24, 25.

Openings 26, 27 are then drilled through the wall 20 and countersunk as at 28, 29. Guide surfaces 24, 25 are then utilized to guide a drill for forming openings 30, 31 in annular walls 22, 23. Openings 30, 31 are also countersunk as at 32, 33. A curved conduit 12 of soft copper is then positioned with one end engaging the shoulder formed by the countersink 28 and its other end engaging the saddle 24. A force is then applied to the conduit in the direction of the arrow F, as viewed in FIG. 5, to deform the conduit and force the other end thereof against the counterbore 32. The force is applied preferably at the point of greatest curvature. The ends of the conduits 12 are then fixed to the body as by silver soldering. Curved conduit 13 is similarly formed and applied to a final configuration such as shown to the right in FIG. 5.

It can thus be seen that the present invention provides a faucet body which can be made of brass, which utilizes a low-cost casting and which is made by a novel method.

What is claimed is:

1. In a single handle faucet body,
a unitary cast body comprising a one-piece casting having a wall with a valve seat,
said wall having spaced openings extending therethrough to said valve seat,
said body having integrally connected spaced annular walls thereon spaced from said first-mentioned wall and defining openings having one end open and the other end closed,
each said annular wall having an opening extending therethrough,
and a curved conduit extending externally of said body between one of said openings in said first-mentioned wall and the opening in one said annular wall and thereby providing fluid communication between said one opening in said first-mentioned wall and said opening defined by said one annular wall,
another curved conduit extending externally of said body between the other of said openings in said first-mentioned wall and the opening in the other said annular wall and thereby providing fluid communication between said other opening in said first-mentioned wall and said opening defined by said other annular wall,
each said conduit having its ends fixed to said body adjacent its respective openings,
each end of each said conduit extending at least partially into its respective wall.

2. The combination set forth in claim 1 wherein the axes of said openings into which the ends of each said conduit extend form an obtuse angle.

3. The combination set forth in claim 1 wherein said body has countersunk openings into which the ends of said conduit extend.

4. The combination set forth in claim 1 including a guide surface for each said conduit adjacent the end of the conduit which extends to the opening in the respective annular wall.

5. The combination set forth in claim 1 wherein said casting is made of brass,
said conduits are made of copper.

6. The combination set forth in claim 5 wherein said conduits are connected to said body by soldering.

7. The combination set forth in claim 1 wherein said valve seat is spherical.

8. The combination set forth in claim 1 wherein said spaced annular walls are generally aligned in one plane and said valve seat is spaced from said plane.

9. In a faucet body,
a unitary cast body comprising a one-piece casting having a wall with a valve seat,
said wall having spaced openings extending therethrough to said valve seat,
said body having integrally connected spaced annular walls thereon spaced from said first-mentioned wall and defining openings having one end open and the other end closed,
each said annular wall having an opening extending therethrough, and a curved conduit extending externally of said body between one of said openings in said first-mentioned wall and opening in one said annular wall and thereby providing fluid communication between said one opening in said first-mentioned wall and said opening defined by said one annular wall, another curved conduit extending externally of said body between the other of said openings in said first-mentioned wall and the opening in the other said annular wall and thereby providing fluid communication between said other opening in said first-mentioned wall and said opening defined by said other annular wall, each said conduit having its ends fixed to said portions of said body surrounding the ends, the axes of said openings into which the ends of each said conduit extend form an obtuse angle, said body has countersunk openings into which the ends of said conduits extend, a guide surface for each said conduit adjacent the end of the conduit which extends to the opening in the respective annular wall, each end of each said conduit extending at least partially into its respective wall.

10. The combination set forth in claim 9 wherein said casting is made of brass, said conduits are made of copper.

11. The combination set forth in claim 9 wherein said valve seat is spherical

12. The combination set forth in claim 9 wherein said spaced annular walls are generally aligned in one plane and said valve seat is spaced from said plane.

* * * * *